(12) United States Patent
Guo et al.

(10) Patent No.: US 7,966,043 B2
(45) Date of Patent: Jun. 21, 2011

(54) METHOD FOR CREATING MULTIPLE-INPUT-MULTIPLE-OUTPUT CHANNEL WITH BEAMFORMING USING SIGNALS TRANSMITTED FROM SINGLE TRANSMIT ANTENNA

(75) Inventors: Li Guo, Irving, TX (US); Hang Jin, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 673 days.

(21) Appl. No.: 11/947,754

(22) Filed: Nov. 29, 2007

(65) Prior Publication Data
US 2008/0139137 A1 Jun. 12, 2008

Related U.S. Application Data

(60) Provisional application No. 60/873,721, filed on Dec. 9, 2006.

(51) Int. Cl.
*H04M 1/00* (2006.01)
*H03C 7/02* (2006.01)
*H04B 1/02* (2006.01)
*H04B 7/02* (2006.01)

(52) U.S. Cl. .................. 455/562.1; 455/276.1; 455/101; 455/133; 455/137

(58) Field of Classification Search ............... 455/562.1, 455/276.1–278.1, 63.1, 63.4, 69, 114.2, 67.11, 455/67.16, 129, 506, 423, 25, 82, 575.7, 455/107, 289, 279.1, 273, 125, 67.13, 561, 455/130, 101, 132, 133, 137; 370/294, 329; 342/268; 375/295, 347, 267, 260, 299
See application file for complete search history.

(56) References Cited

U.S. PATENT DOCUMENTS

| | | | | |
|---|---|---|---|---|
| 6,377,631 | B1 * | 4/2002 | Raleigh | 375/299 |
| 6,687,492 | B1 * | 2/2004 | Sugar et al. | 455/276.1 |
| 7,308,287 | B2 * | 12/2007 | Vaidyanathan | 455/562.1 |
| 7,346,115 | B2 * | 3/2008 | Howard et al. | 375/260 |
| 7,483,675 | B2 * | 1/2009 | Kent et al. | 455/67.11 |
| 7,573,945 | B2 * | 8/2009 | Tesfai et al. | 375/267 |
| 2002/0118781 | A1 * | 8/2002 | Thomas et al. | 375/347 |
| 2002/0127978 | A1 * | 9/2002 | Khatri | 455/103 |
| 2003/0002450 | A1 * | 1/2003 | Jalali et al. | 370/294 |
| 2003/0108117 | A1 * | 6/2003 | Ketchum et al. | 375/295 |
| 2003/0139194 | A1 * | 7/2003 | Onggosanusi et al. | 455/506 |
| 2006/0146725 | A1 | 7/2006 | Li et al. | |

OTHER PUBLICATIONS

International Search Report and Written Opinion dated May 7, 2008 in Application No. PCT/US07/86143.

* cited by examiner

*Primary Examiner* — Pablo N Tran

(57) ABSTRACT

A method is provided for generating a beamformed multiple-input-multiple-output (MIMO) channel. The method comprises receiving by a first wireless station a first plurality of signals transmitted from a first antenna on a second wireless station, deriving by the first wireless station a second plurality of signals corresponding to a second antenna on the second wireless station from the first plurality of signals, computing first and second beamforming weighting vectors from the first and second plurality of signals, creating a beamformed MIMO channel between the first and second wireless stations using the first and second beamforming weighting vectors, and allocating a predetermined transmitting power to signals beamformed by the first and second beamforming weighting vectors.

30 Claims, 3 Drawing Sheets

METHOD FOR CREATING MULTIPLE-INPUT-MULTIPLE-OUTPUT CHANNEL WITH BEAMFORMING USING SIGNALS TRANSMITTED FROM SINGLE TRANSMIT ANTENNA

CROSS REFERENCE

The present application claims the benefit of U.S. Provisional Application Ser. 60/873,721, which was filed on Dec. 9, 2006.

BACKGROUND

A multiple-input-multiple-output (MIMO) network comprises a base transceiver station (BTS) with multiple antennas and multiple mobile stations (MS), of which at least one has multiple antennas. Utilizing a beamforming technique can enhance the performance of a MIMO network.

In a MIMO network deploying BTS equipped with multiple antennas, the BTS computes beamforming weighting vectors for an MS using signals transmitted from the MS. The BTS sends messages to the MS via beamformed signals generated with the beamforming weighting vectors. The signals sent from the multiple antennas on the BTS are weighted based on phase and magnitude and are coherently combined at the receiving MS.

Given that there are M antennas on the BTS and N antennas on one of the MSs, there will be an M×N MIMO channel between the BTS and the MS. By applying L beamforming weighting vectors to the antennas on the BTS, an L×N MIMO channel is created between the BTS and the MS. The quality of the beamforming weighting vectors is crucial to the performance of the L×N MIMO channel.

Several methods utilizing signals transmitted from the MS antennas have been developed to compute beamforming weighting vectors for the BTS. When applied to the multiple antennas on the BTS, these beamforming weighting vectors facilitates the increasing of the signal strength.

An often-used method for computing beamforming weighting vectors is to acquire the primary eigenvector of a covariance eigenvalue problem that describes the communication channel. Using this method, signals sent from the target antenna are regarded as desired signals while those sent from other antennas are regarded as interference signals.

According to the method described above, an MS equipped with multiple antennas must transmit signals from each antenna individually. A BTS detects signals transmitted from each antenna individually and separates interference signals from desired signals.

As a result, the transmitter of the MS must switch among multiple antennas and transmit signals from one antenna at a time so that the BTS can receive signals from all MS antennas. This requirement increases the complexity of MS design and communication protocol significantly. As such what is desired is a method and system for creating MIMO channel with beamforming using signals transmitted from single transmit antenna on an MS.

SUMMARY

A method is provided for generating a beamformed multiple-input-multiple-output (MIMO) channel. The method comprises receiving by a first wireless station a first plurality of signals transmitted from a first antenna on a second wireless station, deriving by the first wireless station a second plurality of signals corresponding to a second antenna on the second wireless station from the first plurality of signals, computing first and second beamforming weighting vectors from the first and second plurality of signals, creating a beamformed MIMO channel between the first and second wireless stations using the first and second beamforming weighting vectors, and allocating a predetermined transmitting power to signals beamformed by the first and second beamforming weighting vectors.

The construction and method of operation of the invention, however, together with additional objects and advantages thereof, will be best understood from the following description of specific embodiments when read in connection with the accompanying drawings.

BRIEF DESCRIPTION OF THE DRAWING

The drawings accompanying and forming part of this specification are included to depict certain aspects of the invention. The invention may be better understood by reference to one or more of these drawings in combination with the description presented herein. It should be noted that the features illustrated in the drawings are not necessarily drawn to scale.

DESCRIPTION OF EXAMPLE EMBODIMENTS

The following detailed description of the invention refers to the accompanying drawings. The description includes exemplary embodiments, not excluding other embodiments, and changes may be made to the embodiments described without departing from the spirit and scope of the invention. The following detailed description does not limit the invention. Instead, the scope of the invention is defined by the appended claims.

A method is provided for creating a multiple-input multiple-output (MIMO) channel with beamforming in a MIMO network. The beamforming weighting vectors are computed by partially nulling out interference signals for a mobile station (MS) equipped with multiple antennas. Transmission power of each logical antenna created by applying the beamforming weighting vectors to a plurality of antennas on a base transceiver station (BTS) is determined in accordance with a predetermined power distribution method.

Figure 1:
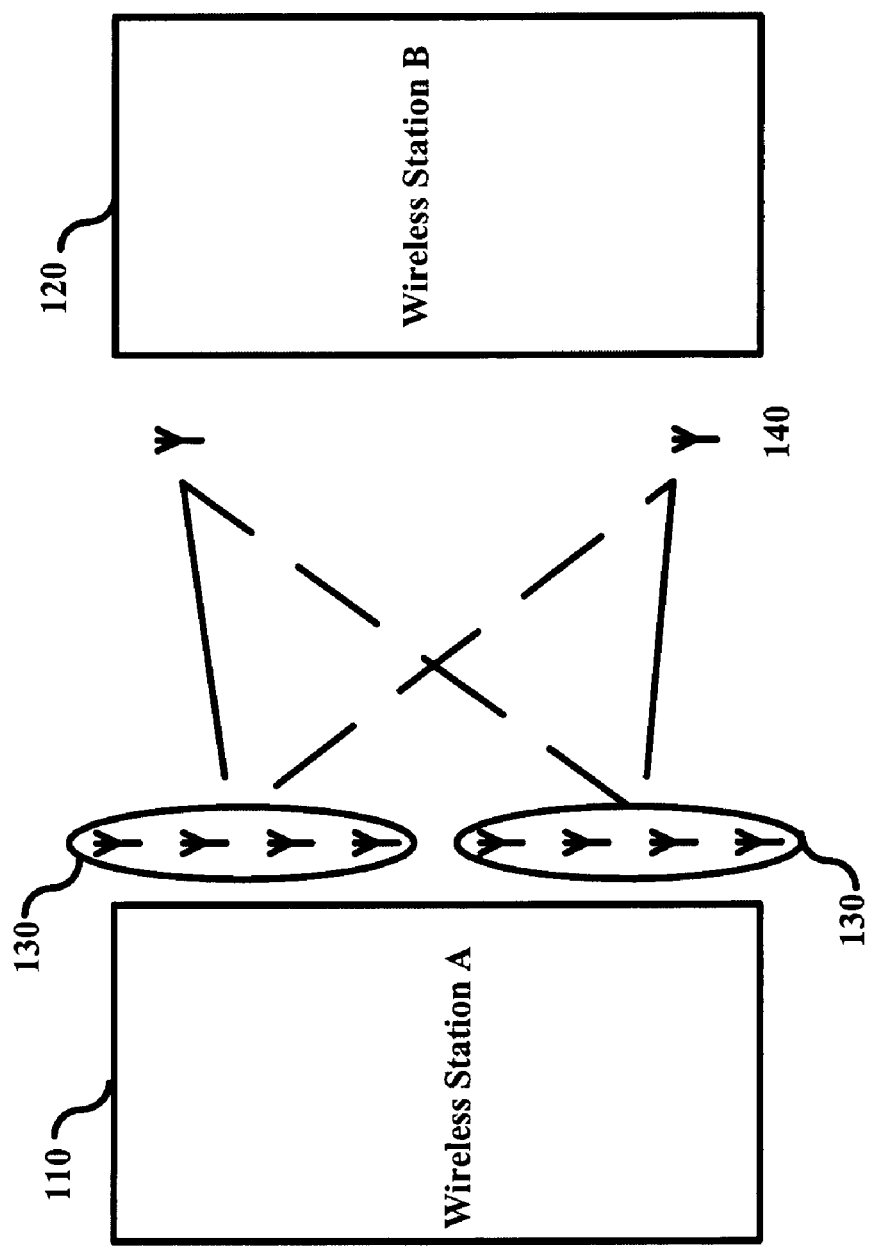
FIG. 1 illustrates a typical M×N MIMO network comprising two or more wireless stations.

FIG. 1 illustrates a typical M×N MIMO network comprising two or more wireless stations. The first wireless station 110 has M antennas 130, and the second wireless station 120 has N antennas 140.

By applying the method disclosed in the present invention, the M×N MIMO network forms an L×N virtual MIMO channel. FIG. 1 shows a MIMO channel of size 2×2 from the first wireless station 110 to the second wireless station 120. The MIMO channel of size 2×2 is formed by applying two beamforming weighting vectors to the M antennas 130.

Figure 2:
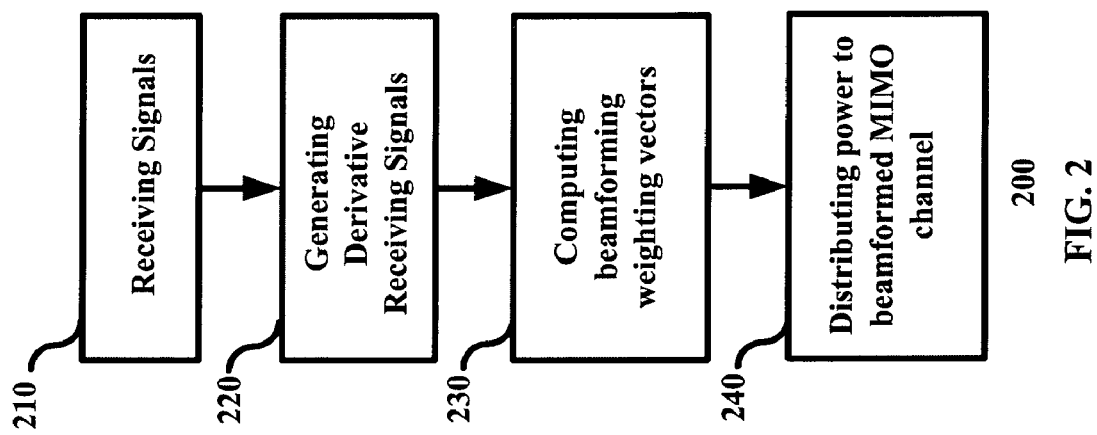
FIG. 2 illustrates a method for creating a beamformed MIMO channel with power distribution in accordance with an embodiment of the present invention.

FIG. 2 illustrates a method 200 for creating beamformed MIMO channel with power distribution in accordance with an embodiment of the present invention. The method 200 applies to the MIMO network shown in FIG. 1.

The method 200 begins with step 210 where the M antennas on the first wireless station receive signals transmitted from a first antenna i on the second wireless station. A vector of signals transmitted from the antenna i on the second wireless station to the M antennas on the first wireless station is denoted as $S_i$, where $S_i=(S_{i1}, S_{i2}, \ldots, S_{i(M-1)}, S_{iM})$. The $S_{ij}$ represents signals transmitted from the antenna i on the second wireless station to an antenna j on the first wireless station, where $j=1 \ldots M$.

In step 220, the first wireless station generates derivative receiving signals, denoted as $S_k$, using receiving signals transmitted from the antenna i on the second wireless station. The vector $S_k$ of derivative receiving signals is considered as signals transmitted from an antenna k, where $k=(1,N)$ and $k \neq i$, on the second wireless station. The details of the generating of derivative receiving signals are described in FIG. 3.

In step 230, the first wireless station calculates a beamforming weighting vector for each antenna on the second wireless station with all $S_t$, where $t=(1,N)$. A beamforming weighting vector for an antenna t on the second wireless station, where $t=(1,N)$ is represented by $W_t=(W_{t1}, W_{t2}, \ldots W_{t(M-1)}, W_{tM})$, where $\text{Norm}(W_t)=1$. One having skills in the art would recognize that the Norm(.) represents a vector norm.

When the first wireless station computes a beamforming weighting vector $W_t$ for the antenna t, signals transmitted from the antenna t on the second wireless station to the first wireless station are regarded as desired signals. By contrast, signals transmitted from one or more remaining antennas on the second wireless station to the first wireless station are regarded as interference signals.

The beamforming weighting vector $W_t$ for the antenna t on the second wireless station is the primary eigenvector of the following matrix: $(\alpha_t * R_t + \sigma_n^2 * I)^{-1} R_s * W_t = \lambda * W_t$ (1), where $R_t$ is a covariance matrix calculated from interference signals; $\sigma_n$ is the standard deviation of channel noise; $R_s$ is a covariance matrix calculated from desired signals; I is the identity matrix; $\lambda$ is the maximum eigenvalue; and $\pi_t$ is a scaling factor for partially nulling out interference signals, where $0 < a_t < 1$.

The scaling factor $\alpha_t$ in equation 1 defines the degree of partial nulling of interference signals. The larger $\pi_t$ is, the less correlated the signals in the beamformed MIMO channels are and the smaller the beamformed gain is. The scaling factor $\alpha_t$ can be changed dynamically according to operating conditions.

In step 240, a beamformed MIMO channel is created between the first and the second wireless stations by applying the beamforming weighting vectors to the M antennas on the first wireless station. The beamforming weighting vectors are normalized to find a balanced distribution of transmitting power.

Power is distributed according to the following formulas. Let P denote the total transmitting power. The power allocated to the signals beamformed with the beamforming weighting vector $W_t$ is $P_t=A_t P$, where $t=(1,N-1)$; P is the total transmitting power; and $0 \leq A_t \leq 1$. The power allocated to the signal beamforme with the last beamforming weighting vector is equal to $$P_N = \left(1 - \sum_{t=1}^{N-1} A_t\right) P.$$

A predetermined number $A_t$ is a function of receive sensitivity, signal type, channel conditions and other factors.

The method disclosed in the present invention creates a plurality of beamformed signals that have a certain level of de-correlation. Nulling out all interference signals de-correlates signals on the beamformed MIMO channel completely, which makes the MIMO signal detection trivial for the receiver of the wireless station. However, applying such beamforming weighting vectors could reduce the gain of signal strength, and the level of reduction is proportional to the degree of nulling of interference signals.

Figure 3:
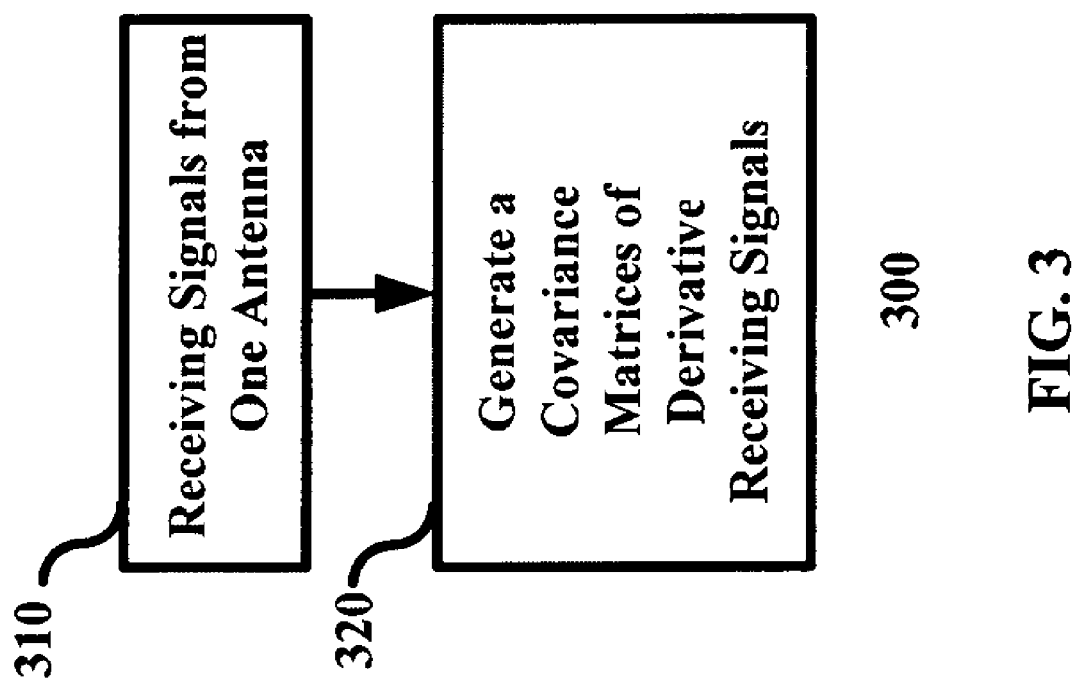
FIG. 3 describes a method for generating derivative receiving signals for the method illustrated in FIG. 2.

FIG. 3 described how derivative receiving signals are generated. In step 310, $S_i,w$ denotes a vector of signals transmitted from an antenna i on the second wireless station to the M antennas on the first wireless station at time instance w, and $S_{i,w}=(S_{i1}, S_{i2}, \ldots S_{i(M-1)}, S_{iM})$ An element $(S_{ij})_w$ represents signals transmitted from the antenna i on the second wireless station to an antenna j on the first wireless station at time instance w, where $j=1 \ldots M$ and $w=1 \ldots l$. As such, $S_{i,1}$ is the vector representing the first set of receiving signals while $S_{i,l}$ is the vector representing the last set of receiving signals.

In step 320, a covariance matrix of derivative receiving signals $S_k$ is computed, where $k=(1,N)$ and $k \neq 1$. There are two ways to generate a covariance matrix of derivative receiving signals $S_k$. The first one is to use the last set of receiving signals, denoted as a vector $S_{i,l}$, to generate a vector of derivative receiving signals $S_k$. The vector $S_k$ is generated according to the following equation: $S_k = \alpha_k \times S_{i,l} \beta_k \times V$, where $\alpha_k$ and $\beta_k$ are numbers between 0 and 1; V is a randomly generated vector; and $S_{i,l}$ is the vector representing the last set of receiving signals. A covariance matrix $R_k$ of the derivative receiving signals is computed according to the following equation: $R_k=(S_k)^H S_k$, where $(\ldots)^H$ is a Hermitian operator.

The second way to generate a covariance matrix of derivative receiving signals $S_k$ is to use all receiving signals $S_{i,w}$, where $w=1 \ldots l$, to generate a covariance matrix of derivative receiving signals. A covariance matrix $R_k$ of derivative receiving signals k is computed according to the following equation:

$$R_k = \sum_{w=1}^{l} a_{k,w}(S_{i,w})^H S_{i,w} + b(V)^H V,$$

where $S_{i,w}$ is a vector of signals transmitted from an antenna i on the second wireless station to the M antennas on the first wireless station at time instance w; $(\ldots)^H$ is a Hermitian transpose operator; and V is a randomly generated vector. Coefficients $a_{k,w}$ and b are predetermined numbers between 0 and 1. The coefficients change dynamically according to predetermined channel conditions.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. A method comprising:
   receiving at a plurality of antennas of a first wireless station a first plurality of signals transmitted from only a first antenna of a second wireless station;
   at the first wireless station, deriving from the first plurality of signals a second plurality of signals representative of signals transmitted only by a second antenna of the second wireless station;
   computing first and second beamforming weighting vectors with respect to the first and second antennas, respectively, of the second wireless station, based on the first plurality of signals and second plurality of signals;
   applying the first and second beamforming weighting vectors to signals to be transmitted via the plurality of antennas of the first wireless station to the second wireless station thereby creating a beamformed multiple-input multiple-output (MIMO) channel between the first and second wireless stations; and
   allocating transmitting power to the signals beamformed by the first and second beamforming weight vectors.

2. The method of claim 1, wherein the first plurality of signals comprises data signals and sounding signals.

3. The method of claim 1, wherein receiving the first plurality of signals comprises receiving at the plurality of antennas of the first wireless station the first plurality of signals transmitted from only the first antenna of the second wireless station at a plurality of time instances, and wherein deriving comprises deriving the second plurality of signals from the first plurality of signals transmitted at one or more of the plurality of time instances.

4. The method of claim 3, wherein deriving the second plurality of signals comprises generating the second plurality of signals according to the equation: $S_k = \alpha_k \times S_{i,j} + \beta_k \times V$, where $\alpha_k$ and $\beta_k$ are predetermined numbers; V is a randomly generated vector; and $S_{i,j}$ is a vector representing the signals transmitted from the first antenna on the second wireless station at a last time instance.

5. The method of claim 4, wherein values for $\alpha_k$ and the $\beta_k$ are between 0 and 1.

6. The method of claim 3, wherein computing the first and second beamforming weighting vectors comprises:
   calculating a covariance matrix from the first plurality of signals transmitted from the first antenna on the second wireless station and received at the plurality of antennas of the first wireless station;
   computing covariance matrices from the second plurality of signals; and
   computing two or more primary eigenvectors of the matrices: $(\alpha_t^* R_t + \sigma_n^{2*} I)^{-1} R_s^* W_t = \lambda^* W_t$, where $t = (1, N)$; $R_t$ is a covariance matrix calculated from interference signals corresponding to signals transmitted from antennas other than the first antenna of the second wireless station; $\sigma_n$ is the standard deviation of channel noise; $R_s$ is a covariance matrix calculated from desired signals corresponding to signals transmitted from the first antenna of the second wireless station; I is the identity matrix; $\lambda$ is a maximum eigenvalue; and $\alpha_t$ is a scaling factor, wherein each of two or more primary eigenvectors corresponds to a beamforming weighting vector with respect to an antenna of the second wireless station.

7. The method of claim 6, wherein computing the covariance matrices for the second plurality of signals is based on the equation: $R_k = (S_k)^H S_k$ where $(\ldots)^H$ is a Hermitian transpose operator and $S_k$ represents the second plurality of signals derived from vector representing the first plurality of signals transmitted only from the first antenna of the second wireless station at a last time instance.

8. The method of claim 6, wherein computing covariance matrices from the second plurality of signals based on the equation:

$$R_k = \sum_{w=1}^{l} a_{k,w}(S_{i,w})^H S_{i,w} + b(V)^H V,$$

where $S_{i,w}$ is a vector of signals transmitted from antenna i of the second wireless station to M antennas of the first wireless station at time instance w; $(\ldots)^H$ is a Hermitian operator; V is a randomly generated vector; and
   coefficients $a_{k,w}$, and b are predetermined numbers.

9. The method of claim 8, wherein the values of coefficients $a_{k,w}$ and b are between 0 and 1.

10. The method of claim 8, and further comprising changing the coefficients $a_{k,w}$ and b dynamically according to channel conditions.

11. The method of claim 6, wherein the scaling factor $\alpha_t$ defines a degree of nulling of the interference signals.

12. The method of claim 1, wherein allocating transmitting power comprises allocating transmitting power based on the formula: $P_t = A_t P$, where P denotes the total transmitting power; $P_t$ is power allocated to a signal beamformed by beamforming weighting vector $W_t$; where t is an index of beamforming weighting vectors; and $A_t$ is a predetermined number.

13. The method of claim 12, wherein allocating comprises allocating the transmitting power to a signal beamformed by a last beamforming weighting vector based on the following formula:

$$P_N = \left(1 - \sum_{t=1}^{N-1} A_t\right) P,$$

where N is the number of beamforming weighting vectors.

14. The method of claim 12, wherein the predetermined number $A_t$ is based on receive sensitivity, signal type, and channel conditions.

15. The method of claim 12, wherein the predetermined number $A_t$ is between 0 and 1.

16. A method comprising:
   receiving at a plurality of antennas of a first wireless station a first plurality of signals comprising data signals and sounding signals transmitted from only a first antenna of a second wireless station at a plurality of time instances;
   at the first wireless station, deriving from the plurality of time instances of the first plurality of signals a second plurality of signals, representative of signals transmitted only by a second antenna of the second wireless station;
   computing first and second beamforming weighting vectors with respect to the first and second antennas, respectively, of the second wireless station, based on the first plurality of signals and second plurality of signals;
   applying the first and second beamforming weighting vectors to signals to be transmitted via the plurality of antennas of the first wireless station to the second wireless station thereby creating a beamformed multiple-input multiple-output (MIMO) channel between the first and second wireless stations; and allocating transmitting power to the signals beamformed by the first and second beamforming weight vectors.

17. The method of claim 16, wherein computing the first and second beamforming weighting vectors comprises:
calculating a covariance matrix from the first plurality of signals transmitted from only the first antenna on the second wireless station and received at the plurality of antennas of the first wireless station;
computing covariance matrices from the second plurality of signals; and
computing two or more primary eigenvectors of the matrices: $(\alpha_t * R_i + \sigma_n^2 * I)^{-1} R_s * W_t = \lambda * W_t$, where $t=(1, N)$; $R_i$ is a covariance matrix calculated from interference signals corresponding to signals transmitted from antennas other than the first antenna of the second wireless station; $\sigma_n$ is the standard deviation of channel noise; $R_s$ is a covariance matrix calculated from desired signals corresponding to signals transmitted from the first antenna of the second wireless station; I is the identity matrix; $\lambda$ is a maximum eigenvalue; and $\alpha_t$ is a scaling factor, wherein each of two or more primary eigenvectors corresponds to a beamforming weighting vector with respect to an antenna of the second wireless station.

18. The method of claim 17, wherein deriving the second plurality of signals comprises generating the second plurality of signals according to the equation: $S_k = \alpha_k \times S_{i,j} + \beta_k \times V$, where $\alpha_k$ and $\beta_k$ are predetermined numbers; V is a randomly generated vector; and $S_{i,j}$ is a vector representing the signals transmitted only from the first antenna on the second wireless station at a last time instance.

19. The method of claim 18, wherein values for $\alpha_k$ and $\beta_k$ are between 0 and 1.

20. The method of claim 17, wherein computing the covariance matrices for the second plurality of signals is based on the equation: $R_k = (S_k)^H S_k$ where $(\ldots)^H$ is a Hermitian transpose operator and $S_k$ represents the second plurality of signals derived from the vector representing the first plurality of signals transmitted only from the first antenna of the second wireless station at a last time instance.

21. The method of claim 17, wherein computing covariance matrices from the second plurality of signals is based on the equation:

$$R_k = \sum_{w=1}^{t} a_{k,w}(S_{i,w})^H S_{i,w} + b(V)^H V,$$

where $S_{i,w}$ is a vector of signals transmitted only from an antenna i of the second wireless station to M antennas of the first wireless station at time instance w; $(\ldots)^H$ is a Hermitian operator; V is a randomly generated vector; and
coefficients $a_{k,w}$ and b are predetermined numbers.

22. The method of claim 21, wherein values of the coefficients $a_{k,w}$ and b are between 0 and 1.

23. The method of claim 21, and further comprising changing the coefficients $a_{k,w}$ and b dynamically according to channel conditions.

24. The method of claim 17, wherein the scaling factor $\alpha_t$ defines a degree of nulling of the interference signals.

25. The method of claim 17, wherein allocating transmitting power comprises allocating transmitting power based on the formula: $P_t = A_t P$, where P denotes the total transmitting power; $P_t$ is power allocated to a signal beamformed by beamforming weighting vector $W_t$; where t is an index of beamforming weighting vectors; and $A_t$ is a predetermined number.

26. The method of claim 25, wherein allocating comprises allocating the transmitting power to a signal beamformed by a last beamforming weighting vector based on the formula:

$$P_N = \left(1 - \sum_{t=1}^{N-1} A_t\right) P,$$

where N is the number of beamforming weighting vectors.

27. The method of claim 25, wherein the predetermined number $A_t$ is based on receive sensitivity, signal type, and channel conditions.

28. The method of claim 25, wherein the predetermined number $A_t$ is between 0 and 1.

29. The method of claim 1, wherein deriving comprises deriving the second plurality of signals that are representative of, but not actual, signals transmitted only from the second antenna of the second wireless station.

30. The method of claim 16, wherein deriving comprises deriving the second plurality of signals that are representative of, but not actual, signals transmitted only from the second antenna of the second wireless station.

* * * * *